Aug. 15, 1950

N. BISHOP 2,519,017

PHASE LAG CORRECTION CIRCUIT FOR THE
SWEEP CIRCUIT OF A RADIO ECHO SYSTEM

Filed Nov. 9, 1945

Inventor:
Nathaniel Bishop,
by Merton D. Moore
His Attorney.

Patented Aug. 15, 1950

2,519,017

UNITED STATES PATENT OFFICE 2,519,017

PHASE LAG CORRECTION CIRCUIT FOR THE SWEEP CIRCUIT OF A RADIO ECHO SYSTEM

Nathaniel Bishop, Fairfield, Conn., assignor to General Electric Company, a corporation of New York Application November 9, 1945, Serial No. 627,720

2 Claims. (Cl. 343—11)

My invention relates to radio detecting and ranging equipment and it has for its primary object to improve the accuracy of such a system for determining the true location of detected objects.

In radio detection and ranging systems of the type in which high frequency pulses of energy are radiated from the antenna and received after reflection from an object in the path of the radiated energy, it is customary to employ a cathode ray tube and a circuit for repeatedly sweeping the cathode ray beam of the tube across a fluorescent viewing screen. At the same time, energy from the antenna is supplied to the control grid of the tube and the sweep circuit is so correlated with the pulses of energy that the position of a reflecting object is displayed on the viewing screen. In a system of this type, in which the cathode ray beam is swept back and forth rapidly across the viewing screen, it is desirable that the marks made on the screen by energy reflected from the detected object coincide for both back and forth movements of the sweep circuit.

Accordingly, it is another object of my invention to provide a new and improved circuit for a radio detection and ranging system of this type in which coincidence of the display on successive movements of a sweep circuit is obtained.

It is still another object of my invention to provide a new and improved wave translating circuit employing a filter to remove waves of a first frequency in which the shift in phase of waves of a second frequency caused by the filter is corrected.

One of the features of my invention is the use on an oscillating antenna of a radio detection and ranging system of a dynamoelectric machine to provide a voltage the magnitude of which corresponds with the position of the oscillating antenna. The voltage thus provided is obtained by modulating a higher frequency wave in accordance with the oscillation of the antenna. The modulated wave thereafter is detected to obtain the modulating signals and filtered to remove the higher frequency wave. Means are also provided to correct the shift in phase caused by the filtering circuit so that, when the modulating signal is supplied to a cathode ray tube for sweeping the cathode ray beam of that tube across a viewing screen, coincidence of the display occasioned by the reflecting object for both back and forth sweeps of the beam is secured.

Figure 1:
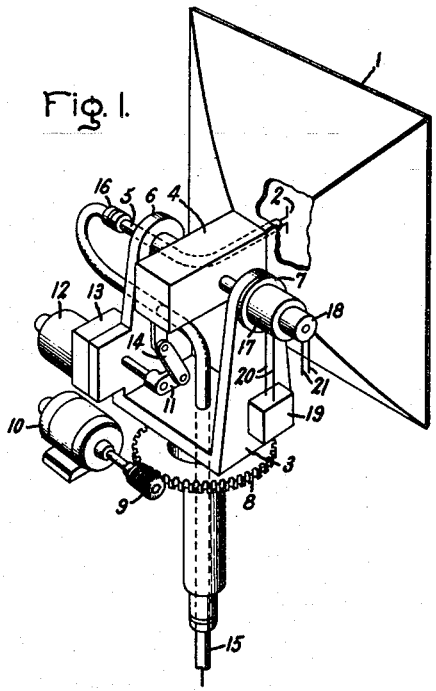
Figure 3:
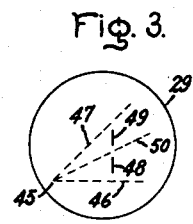
Figure 4:
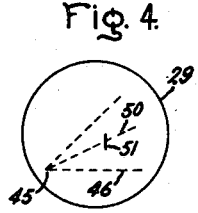
Figure 2:
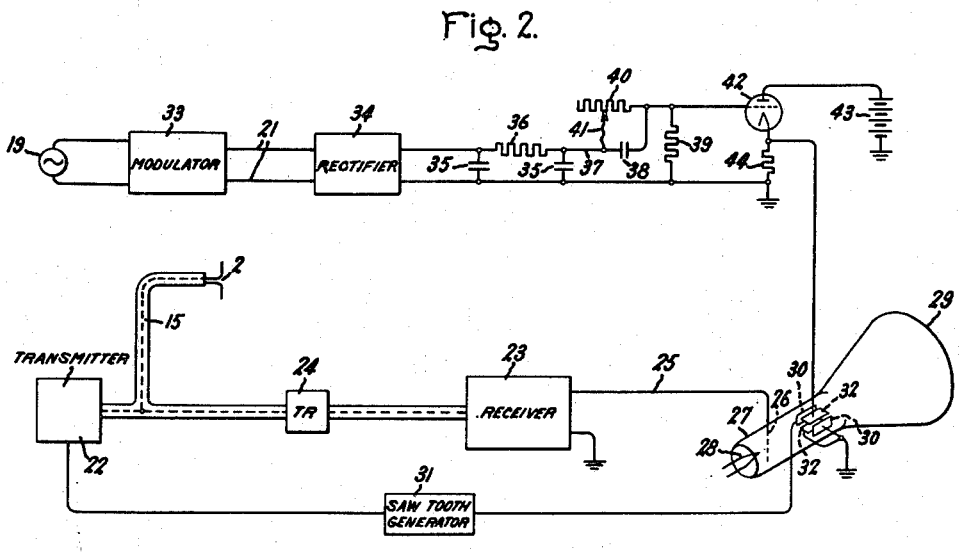

Other objects of my invention will appear from the following description of the invention and the novel features believed to be characteristic of the invention are set forth with particularity in the appended claims. My invention itself, however, both as to its organization and method of operation, together with further objects and advantages thereof, may best be understood by reference to the following description taken in connection with the accompanying drawing in which Fig. 1 is a perspective view of the oscillating antenna of a radio detection and ranging system suitably embodying my invention; Fig. 2 is a portion of the circuit of the system of Fig. 1; and Figs. 3 and 4 illustrate typical cathode ray tube displays demonstrating certain characteristics of the invention.

Referring to Fig. 1 of the drawing, I have there shown a focussing reflector element 1 at the center of which is located a radiating element 2, illustrated as a dipole, and mounted on a supporting structure or pedestal 3. The reflector 1 has a rearwardly extending portion 4 which is affixed to a shaft 5 journalled in bearings 6, 7 of the pedestal 3. The pedestal 3 is adapted to be rotated in azimuth by any suitable means, such as the gear 8, the driving pinion 9, and motor 10. The antenna may be oscillated back and forth in a vertical position by any suitable means, such as the crank 11 which is rotated by a motor 12 through a gear reduction system 13 and which is connected to the member 4 through a crank arm 14.

Pulses of high frequency energy may be supplied to the radiating element 2 from a high frequency transmitter over a coaxial transmission line 15 which passes through a rotating joint 16 to a connecting coaxial line located within shaft 5 and connected to the radiating element 2.

In order that an accurate indication of the instantaneous position of the center line of the radio frequency beam may be obtained, there is provided a dynamoelectric machine which is connected to the shaft 5 and which comprises a stator member 17 rigidly connected to the pedestal 3, and a rotor member 18 which is connected to the one end of the shaft 5. The stator member 17 may include a winding (not shown) which is energized with a relatively high frequency wave, for example, of the order of 1500 cycles per second, from any suitable source of oscillations 19 by means of leads 20. In the output leads of rotor 18 the high frequency waves appear as modulated waves which vary in amplitude in accordance with the position of the reflector 1. The modulated waves, are supplied over leads 21 to the equipment illustrated in Fig. 2 and now to be described.

In Fig. 2, there is shown diagrammatically the circuit of a radio detection and ranging system which includes a transmitter 22 which supplies pulses of high frequency energy over the coaxial transmission line 15 to the radiating element 2. The pulses of high frequency energy radiated from the antenna 2 are projected through space and impinge upon remote objects producing echoes which are intercepted by the antenna 2 and are transmitted over the coaxial line 15 to a receiver 23 which includes the usual TR box 24. The equipment 24 operates to protect the equipment of the receiver from the high intensity of the pulses produced by the transmitter 22. The received pulses are mixed in the receiver 23 with local oscillations to produce oscillations of a low or intermediate frequency in the usual manner. The intermediate frequency oscillations are detected by a detector (not shown), amplified, and supplied over a lead 25 to the control electrode 26 of a cathode ray oscillograph 27.

The cathode ray device 27 includes a cathode 28 for supplying a cathode ray beam which is projected along the tube 27 to impinge upon a viewing screen 29. The device 27 likewise includes a pair of deflection plates 30 to which saw tooth waves of voltage are supplied from a sawtooth generator 31 for repeatedly sweeping the cathode ray beam across the viewing screen 29 in a predetermined pattern. The timing of the wave produced by the sawtooth generator 31 is so correlated with the time occurrence of the pulses of high frequency energy supplied by the transmitter 22 that the sawtooth waves operate to deflect the cathode ray beam of tube 27 over the viewing screen 29 over a period of time equal to that required for a radiated wave to travel to the most remote object to be detected and return.

The cathode ray tube 27 is likewise supplied with a second set of deflection plates 32 to which are supplied a voltage for deflecting the cathode ray beam of the tube 27 in a direction transverse to the deflection occasioned by the wave provided by sawtooth generator 31. The circuit supplying the deflection voltage to the plates 32 comprises the oscillator 19 which is shown as connected to a modulator 33 which comprises the dynamoelectric machine consisting of the stator 17 and the rotor 18 of Fig. 1. The output leads 21 of the winding of rotor 18 are connected to a rectifier or demodulator 34. At the output of the rectifier 34 there appear of course rectified waves of the frequency of the oscillations 19 and also low frequency sinusoidally varying oscillations corresponding to the oscillations of the reflector 1. The currents at the output of the rectifier 34 are filtered through a suitable low pass filter which may comprise the shunt connected capacitors 35 and the series connected resistor 36. The filter elements 35, 36 remove the high frequency oscillations from the rectified waves so that, at the point 37, there is present only the low frequency oscillations corresponding to the oscillations of the reflector 1.

It is known that a filter circuit, such as the filter 35, 36 inherently operates to shift the phase of currents which pass through that filter. Since it is desired that the magnitude of the low frequency oscillations at the point 37 vary in time exactly with the position of the reflector 1, means are provided for correcting for the phase shift introduced by the filter elements 35, 36, which means comprises a capacitance 38 and a resistance 39 which are connected in the output circuit of the filter and a resistance 40 connected in parallel with the capacitance 38. The resistance 40, moreover, has a variable contact 41 so that the phase correction introduced by the elements 38, 39 may be adjusted in value. The low frequency oscillations, after being corrected in phase, are reproduced across the resistance 39 and supplied to the control electrode of an electron discharge device 42 operating as a cathode follower tube. The anode of device 42 is supplied with a positive potential from any suitable source, such as the battery 43, and the variation in potential across a resistor 44 connected in the cathode circuit of the device is supplied to the deflection plates 32.

The operation of the system of Figs. 1 and 2 may best be explained by reference to the cathode ray tube displays illustrated in Figs. 3 and 4. In Fig. 3, the viewing screen 29 is shown. The sawtooth waves of voltage supplied by the generator 31 sweep the cathode ray of the tube 27 horizontally across the screen 29 repeatedly over a path beginning at the point 45. The voltages supplied to the deflection plates 32 vary the trace of the cathode ray tube from the horizontal line 46 to the position 47, the angle between the positions 46, 47 corresponding to the angle through which the reflector 1 is oscillated. It has been found that, because of the lag in phase of voltage at the point 37 occasioned by the filter circuit comprising elements 35, 36, a reflecting object is displayed during the upward sweep of the cathode ray beam as the mark indicated by the number 48, whereas during the downward sweep of the circuit corresponding to the downward movement of the reflector 1, this mark occurs at the point 49. The points 48 and 49 thus are displaced in position and neither occurs at the proper angular position denoted by the line 50. By the use of the phase correcting circuit comprising the elements 38—41, however, the phase shift illustrated in Fig. 3 is corrected so that the display obtained is single and coincident as illustrated in Fig. 4. In such a system, the display of a reflecting object on both upward and downward movements of the radio frequency beam across the reflecting object occurs at the same point as indicated by the mark 51 on Fig. 4. It will be noted likewise that the center of the mark 51 occurs at the correct elevation angle indicated by the line 50 and the correct range position indicated by the distance from the point 45 to the projection of the mark 51 on the line 46.

In the construction of the system described, preferably the frequency of the oscillations 19 is made sufficiently high so that waves of this frequency can be easily removed by the filter 35, 36. Thus, it has been found that in a system in which the antenna is oscillated 30 times per minute, an energizing frequency of the order of 1500 cycles per second for the winding of stator 17 is sufficient.

One of the advantages of my invention is that it may be easily included in a radio detection and ranging system to assure accuracy in the determination of the true location of detected objects. The system is relatively simple in form and in operation. By adjustment of the position of the variable contact 41 on resistance 40, the phase of voltage supplied to the deflection plates 32 may be easily varied so that coincidence of the displays on successive sweepings of the cathode ray tube 27 is obtained.

While my invention has been described by reference to particular embodiments thereof, if will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States, is:

1. In a radio echo system of the type in which pulses of a high frequency carrier wave are radiated from an oscillating antenna and received by the same antenna after reflection from an object in space, means for producing a composite signal comprising a wave of the frequency of the carrier wave modulated with a wave of the frequency of the oscillations of the antenna, means for filtering waves of one of said frequencies, and means connected to the output of said filtering means for correcting the shift in phase of the other of said waves caused by said filtering means, said last means consisting of a resistance connected in series with said filtering means and a capacitance connected in shunt with said resistance, a viewing screen, and means utilizing said corrected wave for repeatedly moving a beam of electrons across said screen.

2. In a radio echo system of the type in which pulses of a high frequency carrier wave are radiated from an oscillating antenna and received by the same antenna after reflection from an object in space, means for producing a composite signal comprising a wave of the frequency of the carrier wave modulated with a wave of the frequency of the oscillations of the antenna, means for demodulating said signal to reproduce both said carrier wave and said modulating wave, filtering means connected to said demodulating means for removing said carrier wave, and means for correcting the shift in phase produced in said modulating wave by said filtering means consisting of a resistance connected in series with said filtering means and a capacitance connected in shunt with said resistance, a viewing screen, and means utilizing said corrected wave for repeatedly moving a beam of electrons across said screen.

NATHANIEL BISHOP.

REFERENCES CITED

The following references are of record in the file of this patent:

UNITED STATES PATENTS

| Number | Name | Date |
| --- | --- | --- |
| 1,586,821 | Mathes | June 1, 1926 |
| 1,703,142 | Green | Feb. 26, 1929 |
| 1,740,491 | Affel | Dec. 24, 1929 |
| 2,231,929 | Lyman | Feb. 18, 1941 |
| 2,379,744 | Pfleger | July 3, 1945 |
| 2,421,747 | Engelhardt | June 10, 1947 |